(12) United States Patent
Tsao

(10) Patent No.: US 7,951,233 B2
(45) Date of Patent: May 31, 2011

(54) REACTIVE COLOR INKS

(75) Inventor: Yi-Hua Tsao, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 979 days.

(21) Appl. No.: 11/256,177

(22) Filed: Oct. 24, 2005

(65) Prior Publication Data

US 2006/0087541 A1 Apr. 27, 2006

Related U.S. Application Data

(60) Provisional application No. 60/621,079, filed on Oct. 25, 2004.

(51) Int. Cl.
*C09D 11/02* (2006.01)

(52) U.S. Cl. ............... 106/31.27; 106/31.43; 106/31.6; 106/31.75

(58) Field of Classification Search ............... 106/31.27, 106/31.6, 31.43, 31, 75
See application file for complete search history.

(56) References Cited

U.S. PATENT DOCUMENTS

| | | | |
|---|---|---|---|
| 5,549,740 A * | 8/1996 | Takahashi et al. | 106/31.43 |
| 5,560,766 A * | 10/1996 | Gundlach | 106/31.27 |
| 5,609,673 A * | 3/1997 | Takimoto et al. | 106/31.48 |
| 5,700,314 A * | 12/1997 | Kurbayashi et al. | 106/31.27 |
| 5,958,121 A | 9/1999 | Lin | |
| 6,120,589 A | 9/2000 | Bannai et al. | |
| 6,139,139 A | 10/2000 | Stoffel et al. | |
| 6,228,156 B1 * | 5/2001 | Higashiyama et al. | 106/31.27 |
| 6,261,350 B1 | 7/2001 | Kabalnov | |
| 6,299,675 B1 * | 10/2001 | Ono et al. | 106/31.27 |
| 6,419,353 B1 | 7/2002 | Adamic et al. | |
| 6,436,180 B1 | 8/2002 | Ma et al. | |
| 6,508,871 B1 * | 1/2003 | Kato et al. | 106/31.27 |
| 6,558,459 B2 | 5/2003 | Schut | |
| 6,572,226 B2 | 6/2003 | Tyvoll | |
| 6,607,589 B2 | 8/2003 | Adamic et al. | |
| 6,630,017 B2 | 10/2003 | Ma et al. | |
| 6,652,085 B2 | 11/2003 | Tsao | |
| 6,673,140 B2 | 1/2004 | Tyrell et al. | |
| 6,793,722 B2 * | 9/2004 | Chien et al. | 106/31.27 |
| 6,830,326 B2 | 12/2004 | Tsao et al. | |
| 7,727,321 B2 * | 6/2010 | Goto et al. | 106/31.48 |

FOREIGN PATENT DOCUMENTS

| | | |
|---|---|---|
| EP | 1 077 239 A | 2/2001 |
| EP | 1 442 889 A | 8/2004 |
| JP | 2003-237218 | 8/2003 |
| JP | 2004-182862 | 7/2004 |
| JP | 2004-210806 | 7/2004 |
| WO | WO01/59012 A1 | 8/2001 |
| WO | WO2004/011560 A2 | 2/2004 |

OTHER PUBLICATIONS

Hunt et al., "High-Quality Inkjet Color Graphics Performance on Plain Paper," Hewlett-Packard Journal, Feb. 1994, pp. 18-27.
Japanese Office Action with English translation in counterpart Application No. 2007-539,063 dispatched on Oct. 26, 2010 (6 pages).

* cited by examiner

*Primary Examiner* — Jerry Lorengo
*Assistant Examiner* — Veronica Faison Gee

(57) ABSTRACT

An ink for use in inkjet printing has a colorant which has a precipitation rate in the presence of a predetermined fixer that is selected to have a value sufficiently low as to enable an increase in dot size of the colorant and produce a better color.

16 Claims, 12 Drawing Sheets

| UNDERPRINTING | MEDIA | GAMUT VOLUME (k) | C | M | Y |
|---|---|---|---|---|---|
| CONTROL | HM | 166 | PJ485 | MAGENTA A | DY132 |
| HIGHEST GAMUT VOLUME | HM | 220 | AB9 | AR52 | DY132/AY23 |
| CONTROL | LL | 233 | PJ485 | MAGENTA A | DY132 |
| HIGHEST GAMUT VOLUME | LL | 305 | AB9 | MAGENTA A | DY132/AY23 |

FIG. 4

| OVERPRINTING | MEDIA | GAMUT VOLUME (k) | C | M | Y |
|---|---|---|---|---|---|
| CONTROL | HM | 171 | PJ485 | MAGENTA A | DY132 |
| HIGHEST GAMUT VOLUME | HM | 198 | AB9 | MAGENTA A | DY132/AY23 |
| CONTROL | LL | 229 | PJ485 | MAGENTA A | DY132 |
| HIGHEST GAMUT VOLUME | LL | 282 | AB9 | MAGENTA A | DY132/AY23 |

FIG. 5

| PRINTMODE | MEDIA | GAMUT VOLUME (k) | C | M | Y |
|---|---|---|---|---|---|
| UP | HM | 210 | PJ485/AB9 | MAGENTA A | DY132/AY23 |
| OP | HM | 196 | PJ485/AB9 | MAGENTA A | DY132/AY23 |
| UP | LL | 283 | PJ485/AB9 | MAGENTA A | DY132/AY23 |
| OP | LL | 275 | PJ485/AB9 | MAGENTA A | DY132/AY23 |

FIG. 6

|  | BAND WIDTH (nm) | BAND CENTER (nm) | CHROMA ON LL |
|---|---|---|---|
| MAGENTA A | 81 | 522 | 74 |
| MAGENTA B | 89 | 525 | 67 |
| MAGENTA C | 91 | 519 | 62 |
| MAGENTA D | 80 | 522 | 73 |
| MAGENTA E | 91 | 519 | 62 |
| ProJet FAST M 2 | 83 | 518 | 70 |
| RR180 | 88 | 520 | 70 |

DJR814/AR289 (2%/
0.7%)

DJR814/AR289 (1.3%/1.4%)

RR23/AR289 (2%/0.7%)

RR23/AR289 (1.3%/1.4%)

AR94 (3%)

ProJet Fast Magenta 2 (3%)

DR227 (3%)

RR180 (3%)

REACTIVE COLOR INKS

This application claims priority from U.S. Provisional Application Ser. No. 60/621,079, filed Oct. 25, 2004. The entire contents of the aforementioned application is incorporated herein by reference.

BACKGROUND OF THE INVENTION

The present invention relates to reactive color inks.

There are many variables that influence the color performance (e.g., OD (optical density) and gamut volume) on media. The colorant type is an obvious factor. Brighter dyes tend to give better colors on paper. However, they are generally less lightfast. Ink and media interaction also plays a major role in the appearance of the color. If inks penetrate into the media, it is expected that the OD/gamut is low. If the ink does not spread well or the dot gain is low, the OD/gamut is generally low. Image and media gloss, in general, helps OD/gamut.

A fixer can be used to increase the durability of ink jet inks in terms of water fastness, smear and smudge fastness, by precipitating the colorant. A typical fixer contains a cationic polymer and/or an acid and/or metal salts. Cationic polymers suitable for ink jet application are polyamine (at low pH), quaternized polyamines and polyguanidine. The fixer is used to immobilize dyes and to increase durability and can be applied prior to the image is printed (underprinting) or after the image is printed (overprinting). However, the impact of the fixer on color performance is twofold. Firstly, the formation of fixer-dye complex causes hue shift in many cases. Secondly, depending on what the morphology of the fixer-dye complex is and how fast the rate of fixer-dye precipitation is, fixer-dye interaction determines where the fixer-dye complex resides on media and changes how the colors appear.

A solution to the hue shift and change in color appearance is therefore necessary.

BRIEF DESCRIPTION OF THE DRAWINGS

FIG. 4 is a table summarizing the best gamut (CMY only) achieved using underprinting.

FIG. 5 is table summarizing the best gamut (CMY only) achieved using overprinting.

FIG. 6 is a table summarizing the best gamut (CMY only) achieved without using pure dyes which are prone to fail lightfastness tests.

FIG. 11 is a table which lists the spectral band width of the spectrum at 0.5 $\lambda$max and band centers for a plurality of different magenta dyes.

DETAILED DESCRIPTION OF THE EXEMPLARY EMBODIMENTS

Figure 1:
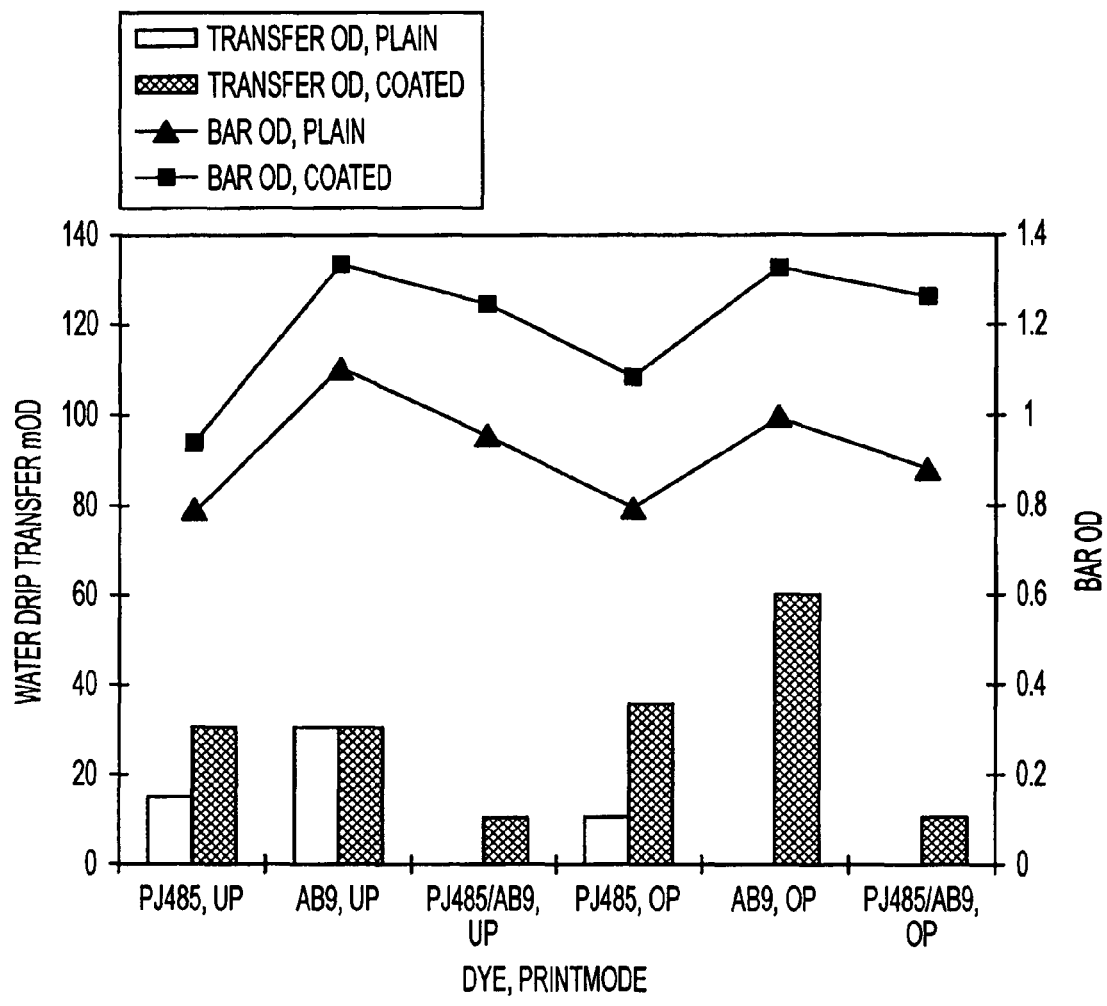
FIG. 1. is a bar graph showing Bar OD v Water Drip Transfer mOD for selected dyes/combination of dyes using underprinting (UP) and overprinting (OP).

The invention is directed to improve color performance by using different dyes and/or and dye mixtures with an ink vehicle. The basis of the invention is to use a single slow-precipitating dye or a blend of fast and slow precipitating colorants in order to optimize color space and other attributes (such as lightfastness and pen reliability). That is to say, as noted above, a fixer induces precipitation of the colorants. However, the rate of precipitation is colorant dependent. Slow precipitating colorants increase dot size and thus enable better color to be achieved as compared with fast precipitating colorants. If the slow precipitating dye is deficient in a certain attribute, it is possible to optimize the color space (chroma) by blending a slow precipitating colorant with a fast precipitating one.

Examples of dyes which can be considered for use include a large number of water-soluble acid and direct dyes. Specific examples of anionic dyes include Direct Yellow 86, Acid Red 249, Direct Blue 199, Direct Black 168, and Direct Yellow 132; Aminyl Brilliant Red F-B (Sumitomo Chemical Co.); the Duasyn line of "salt-free" dyes available from Hoechst, Direct Black 168, Reactive Black 31, Direct Yellow 157, Reactive Yellow 37, Acid Yellow 23, Reactive Red 180, Acid Red 52, Direct Blue 199, and Acid Blue 9; mixtures thereof; and the like. Further examples include Tricon Acid Red 52, Tricon Direct Red 227, and Tricon Acid Yellow 17 (Tricon Colors Incorporated), Bernacid Red 2BMN, Pontamine Brilliant Bond Blue A, BASF X-34, Food Black 2, Catodirect Turquoise FBL Supra Conc. (Carolina Color and Chemical), Direct Blue 86, Intrabond Liquid Turquoise GLL (Crompton and Knowles), Reactive Red 4, Reactive Red 56, Levafix Brilliant Red E-4B (Mobay Chemical), Levafix Brilliant Red E-6BA (Mobay Chemical), Acid Red 92, Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Direct Yellow 86, Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; mixtures thereof, and the like. Examples of preferred dyes can include Pro-Jet 485 (a copper phthalocyanine), Magenta 377, or Direct Yellow 132. This list is intended to be merely exemplary, and should not be considered limiting.

In the disclosure and drawings the following abbreviations are used to designate the following dyes/materials/parameters.

PJ485—Pro-Jet 485 (a copper phthalocyanine)

AB9—Acid Blue 9

Magenta A—an H-acid type dye in the form of Formula (B) in WO01/59012 with a 2,6-dimethylmorpholine substitution on the triazine ring.

DY132—Direct Yellow 132

AY23—Acid Yellow 23

M377—Magenta 377

AR52—Acid Red 52

Magenta B—an H-acid magenta dye which by way of example has the following formula (wherein Q is a cation):

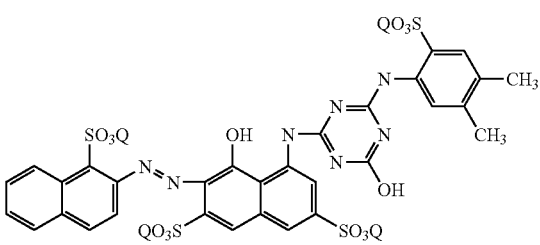

Magenta C—a metalized magenta dye having the formula:

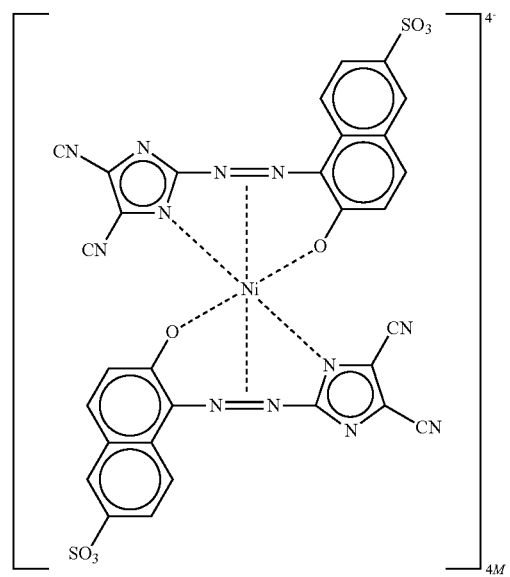

wherein M is H or a monovalent ion, such as $Na^+$, $Li^+$, $K^+$, $NH_4^+$, and combinations thereof.

Magenta D—an H-acid magenta dye having the following formula:

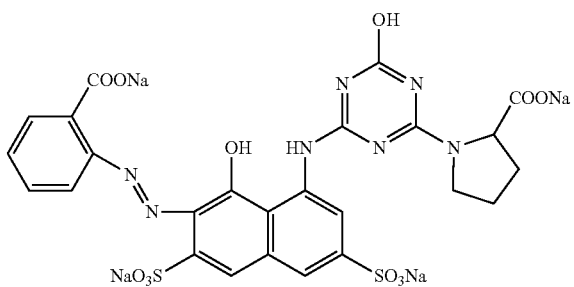

Magenta E—a metalized magenta dye in the form of a nickel chelate of [4-hydroxy-3-(1H-[1,2,4,]triazole-3-ylazo)-naphthalene-1,5-disulfonic acid] for example.

Magenta F—an H-acid magenta dye in the form of Formula (B) in WO01/59012 with a morpholine substitution on the triazine ring.

AR289—Acid Red 289

AR94—Acid Red 94

DR227—Direct Red 227

RR180—Reactive Red 180

RR23—Reactive Red 23

ProJet Fast M2—ProJet Fast Magenta 2 from Avecia

HM—Hammermill®—plain paper.

LL—Lustro Laser® commercially coated glossy paper.

Durability and Color Performance of Various Dyes and Dye Mixtures

It should be noted that in order to achieve an even higher gamut, one or more embodiments of the present invention do not exclude optimization of the dye ratio in the mixtures, using a multi-pass printing technique, and the use of different vehicles.

EXAMPLES

Ink and Fixer Formulations

The ink and fixer formulations are as follows:

Ink

| Component | Wt % |
| --- | --- |
| Dye | 3 |
| 2-Pyrrolidinone | 10 |
| 1,2-Alkanediol | 5 |
| Dowanol PnP | 1 |
| Zonyl FSA | 0.15 |
| Triton X-45 | 0.2 |
| Aerosol OT | 0.45 |
| MOPS | 0.2 |
| EDTANa2 | 0.1 |

Note that the ink was adjusted to pH 7 with NaOH or $HNO_3$ and the dye was either 3% of a single dye or 1.5% of each of two dyes.

Fixer

| Component | Wt % |
| --- | --- |
| Polyguanidine | 4 |
| 2-Pyrrolidinone | 10 |
| 1,2-Alkanediol | 5 |
| Dowanol PnP | 1 |
| Zonyl FSN | 0.3 |
| Brij 30 | 0.4 |

Note that the fixer was adjusted to have a pH of 4 with NaOH or $HNO_3$.

Dyes and Dye Mixtures Tested

Cyan:
1) PJ485,
2) PJ485/AB9 and
3) AB9

Magenta:
1) Magenta A,
2) M377,
3) AR52,
4) Magenta A/M377,
5) Magenta A/AR52 and
6) M377/AR52

Yellow:
1) DY132,
2) AY23, and
3) DY132/AY23

Test Procedure

Durability

An image was printed using a slightly modified HP Business Inkjet 2200 printer manufactured by the Hewlett Packard company. Each of the inks was fixed with either under or over printing using one-pass printmode. Underprinting refers to printing the fixer immediately before inks are printed. Overprinting refers to printing fixer after the inks are printed. Modified HP C4811 pens are used to print inks and fixer at 7 pl per 600 dpi each. The printer was operated under heated condition (85° C.). Hammermill® and Lustro Laser® paper were used. The Hammermill® paper represents normal plain paper and the Lustro Laser® paper represents a commercially coated glossy paper. For durability, the test was performed 24 hours after the image was printed. The media was set a 45-degree angle where about 250 microliters of water was dripped on the bar image. OD of the bar image ("bar OD") and the drip transfer (optical density of non-imaged area just below the dripped imaged area, "drip transfer OD") were measured. "Bar OD" and "drip transfer OD" are the above measured OD's minus the media OD.

Six combinations were printed. These are set forth in the following table.

| Combination | C | M | Y |
| --- | --- | --- | --- |
| 1 (control) | PJ485 | Magenta A | DY132 |
| 2 | AB9 | M377 | AY23 |
| 3 | PJ485/AB9 | AR52 | None |
| 4 | PJ485 | Magenta A/M377 | DY132/AY23 |
| 5 | AB9 | Magenta A/AR52 | None |
| 6 | PJ485/AB9 | M377/AR52 | DY132 |

The purpose of using the fixer is to improve durability of the printed image. The drip/smear tests were carried out 24 hours after the samples were printed. The bar OD, water drip transfer OD and higher smear transfer OD on both papers were measured.

Color

Reflection spectra of CMY and media (white) were measured using a Cary spectrometer. Secondary color spectra (RGB) are estimated based on addition of corresponding secondary colors. Black is the summation of CMY. The spectra were used to calculate L*a*b* for all 8 colors (CMYKRGBW). An estimate of gamut volume was obtained based on the volume enclosed by the 8 colors, though these numbers tended to be an underestimate of a more extensive gamut analysis and system optimization. For instance, incorporation of a black ink will improve the gamut volume significantly.

Summary of Observations

Durability

Figure 2:
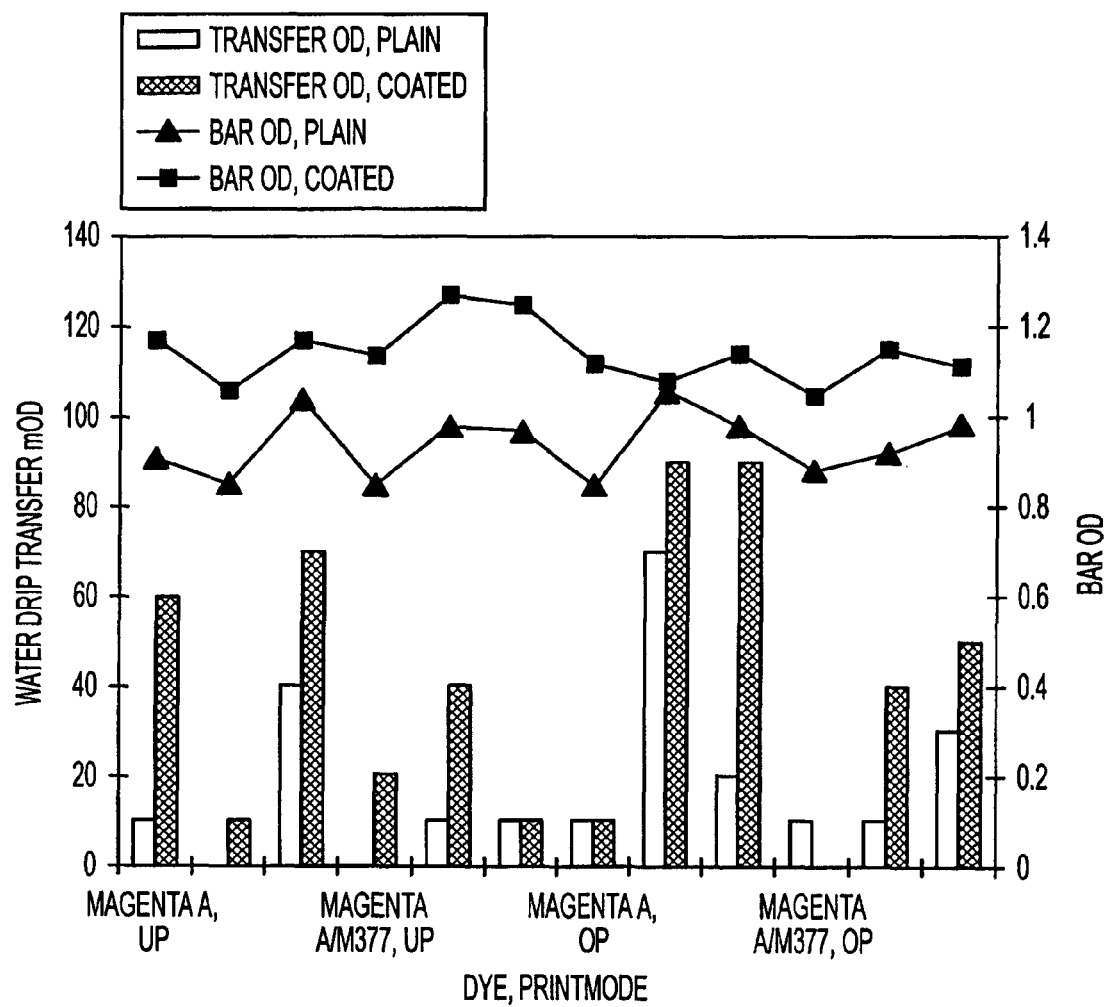
FIG. 2 is a bar graph showing Bar OD v Water Drip Transfer mOD for selected dyes/combination of dyes using underprinting (UP) and overprinting.
Figure 3:
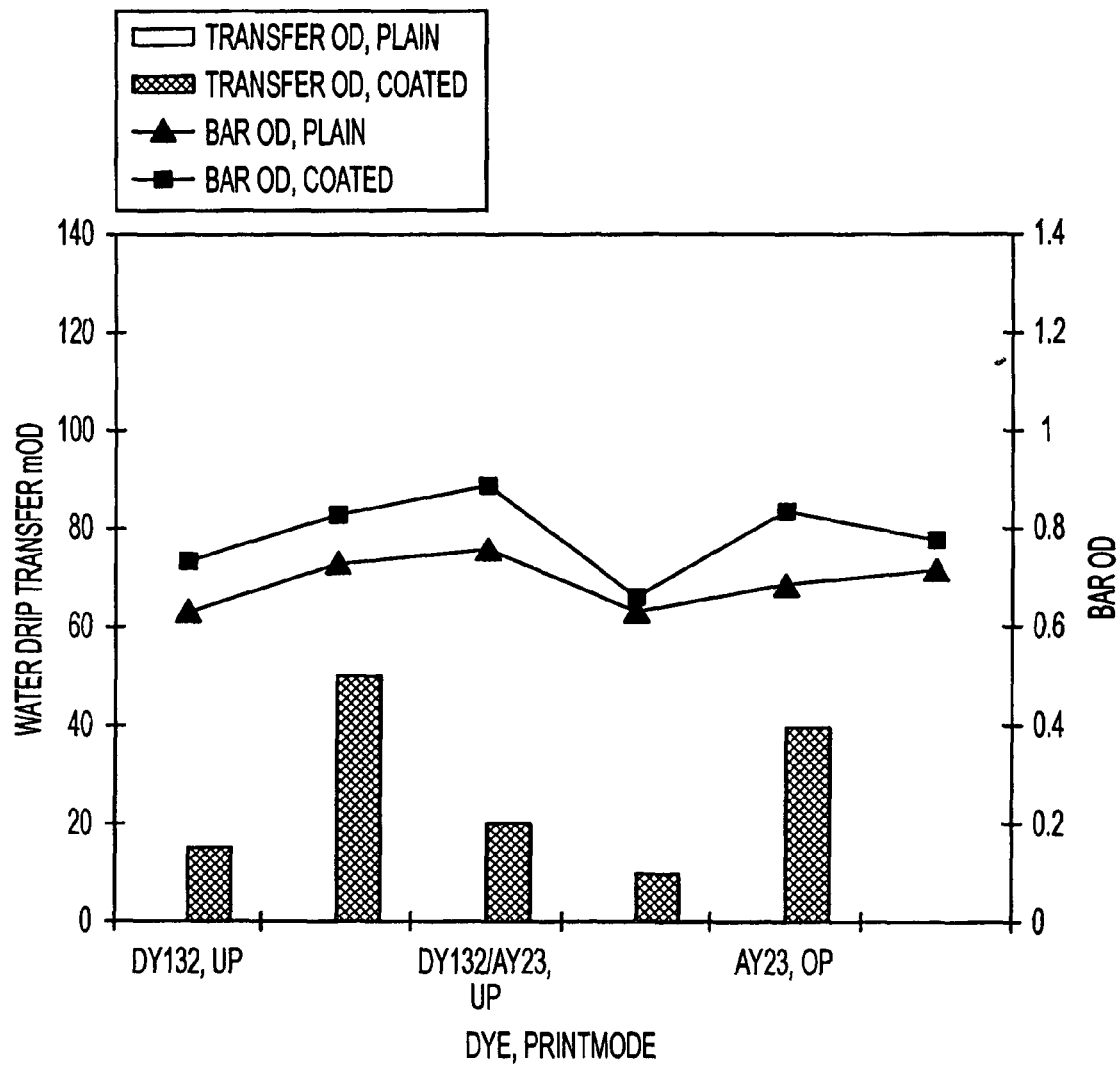
FIG. 3 is a bar graph showing Bar OD v Water Drip Transfer mOD for selected dyes/combination of dyes using underprinting and overprinting.

The bar OD, water drip transfer mOD and wet smudge transfer mOD for cyan, magenta and yellow are shown in FIGS. 1-3, respectively.

For cyan: AB9 itself shows the highest OD, however, the drip performance is not desirable. The PJ485/AB9 mixture shows higher OD and equivalent durability performance compared to PJ485 alone.

For magenta: The signal in OD is not as dramatic as in cyan. Most of the dye or dye mixtures show equal or better durability performance than Magenta A except for AR52 (UP and OP) and M377 (OP).

For yellow: The dye mixtures show relatively higher OD than individual dyes. AY23 shows some water drip transfer. However, the durability performance of the dye mixtures is acceptable.

Color

A list of gamut and % pantone coverage (CMY) is generated with 3 cyan, 6 magenta and 5 yellow dyes/dye mixtures (90 combinations total) on Hammermill and Lustro Laser. The usage of AB9 shows the highest impact on gamut and/or % pantone coverage on both media. The highest gamut volume are listed in the tables shown in FIGS. 4 and 5. However, AB9 is not suitable to be the only dye in ink jet inks due to its lack of lightfastness. With dyes that are not lightfast (e.g., AB9 and AY23), the best set turned out to be PJ485/AB9, Magenta A and DY132/AY23 for UP and OP on both media. The gamut volume is listed in the table shown in FIG. 6. Significant improvement over control in the gamut volume can be achieved by blending the dyes.

Secondary Colors—Green

Figure 7:
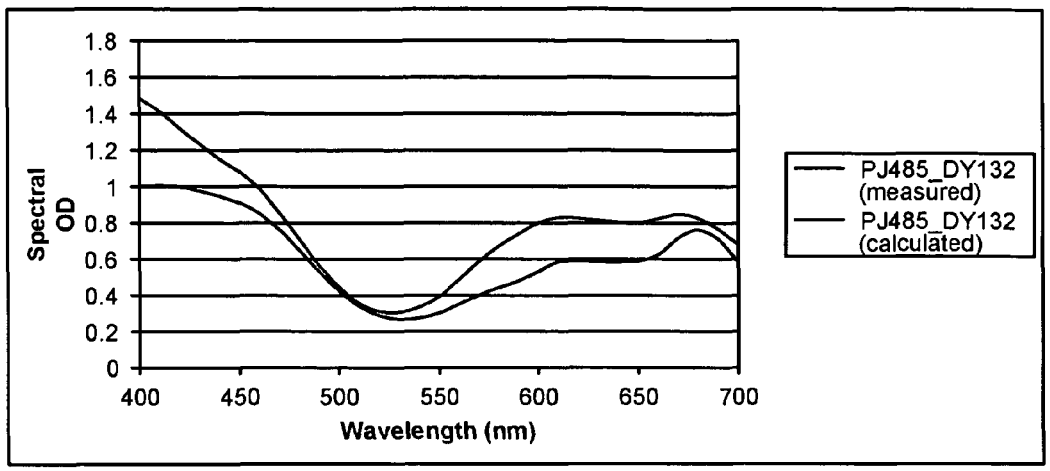
FIGS. 7-9 are graphic comparisons which are plotted in terms of Spectral OD and Wavelength for selected dyes with fixer underprinting.
Figure 8:
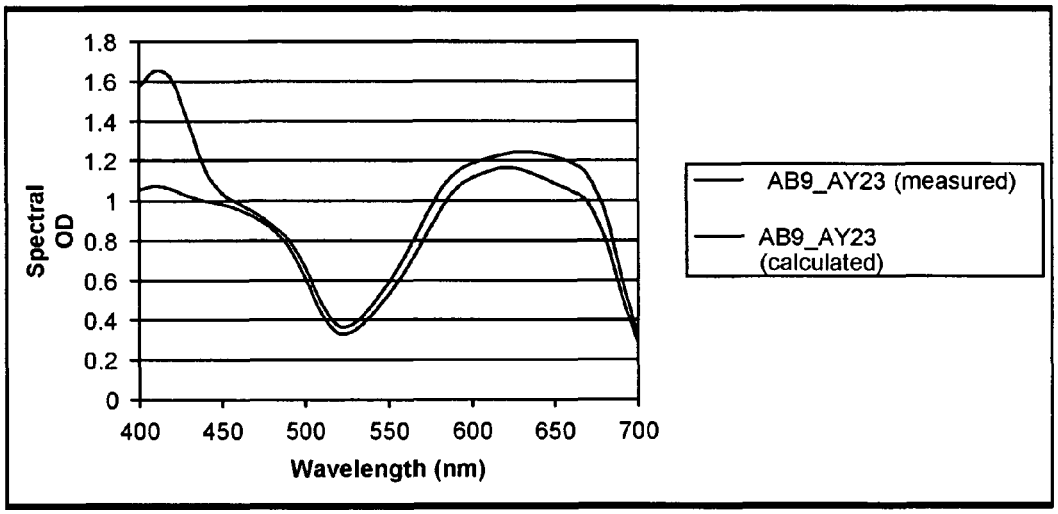
Figure 9:
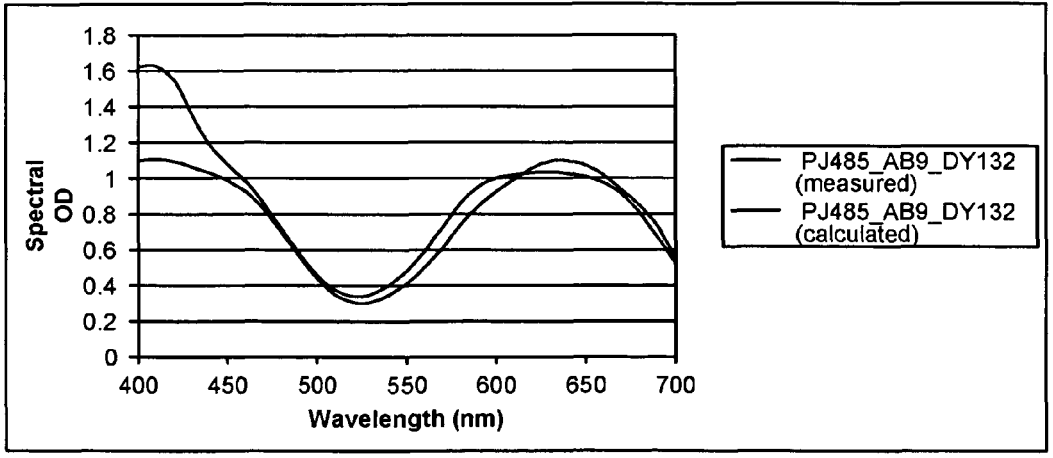

The color calculation performed above does not incorporate input of spectra of secondary colors. The secondaries are calculated based on addition of primary colors. However, this may not the case for green. (Same studies can be done with red and blue as well.) FIGS. 7A-7C represent the comparison of calculated spectral OD's and measured spectral OD's for three green samples with fixer underprinting: PJ485 with DY132, AB9 with AY23 and PJ485/AB9 with DY132. The highest discrepancy between the measurements and calculation appears when pure PJ485 is used. Also shown in FIGS. 8A-8C are micrographs of the green samples. The PJ485 with DY132 sample shows PJ485 forming discrete solid deposits on a uniform yellow background (top). The size of the deposits becomes smaller when PJ485/AB9 is used and the background is greener (bottom). In the case of AB9 with AY23 (middle), no solid deposits are discernible. Similar trend is also observed with overprinting green samples (spectral OD shown in FIGS. 9A-9C), although the effect is not as dramatic as the underprinting samples.

The micrographs and the spectral OD data indicate that the addition rule does not hold if the colors do not mix well when printed. Secondly, the micrographs show that the morphology of fixer-dye complex for PJ485 and AB9 are drastically different. The difference in the morphology of the fixer-dye complex on paper could be due to difference in rate of precipitation of fixer-dye complex as determined by a stopflow device.

In summary, thus far it has been shown that some of the dye blends enhance the color performance without an adverse impact on durability or lightfastness even when the single-dye approach is not possible. For cyan, PJ485/AB9 helps to create a better green than PJ485 due to interesting ink/fixer kinetics as illustrated in the micrographs. In order to achieve higher gamut volume, it is within the scope of the invention to optimize the dye ratio in the mixtures, use 2-pass printing and different vehicles.

The following pertains to Magenta Dyes and Dye Blends: Durability, Color and Kinetics.

In the following examples, several magenta dyes and some of their dye blends are evaluated regarding to durability and color performance. The various magenta inks are tested in the same manner as what was described earlier.

The ink and fixer formulations are as follows:

| Magenta Ink | |
| --- | --- |
| Component | Wt % |
| Dye | 3 (unless noted otherwise) |
| 2-Pyrrolidinone | 11.5 |
| 1,2-alkanediol | 2.5 |
| Crodafos N-3 Acid | 0.5 |
| Zonyl FSA | 0.15 |
| Triton X-45 | 0.35 |
| Aerosol OT | 0.2 |
| MOPS | 0.2 |
| EDTANa2 | 0.1 |
| Proxel GXL | 0.1 |

Note that the ink was adjusted to pH 7 with NaOH or $HNO_3$ and the dye was 3% unless noted otherwise.

Fixer

| Fixer | |
| --- | --- |
| Component | Wt % |
| Polyguanidine | 4 |
| Sulfolane | 7.5 |
| 1,2-alkanediol | 7.5 |
| Zonyl FSN | 0.3 |
| Brij 30 | 0.4 |
| EDTANa2 | 0.05 |
| β-alanine | 0.2 |

Note that the vehicle was adjusted to have a pH of 4 with NaOH or $HNO_3$.

Solution Spectra and Color

Figure 10:
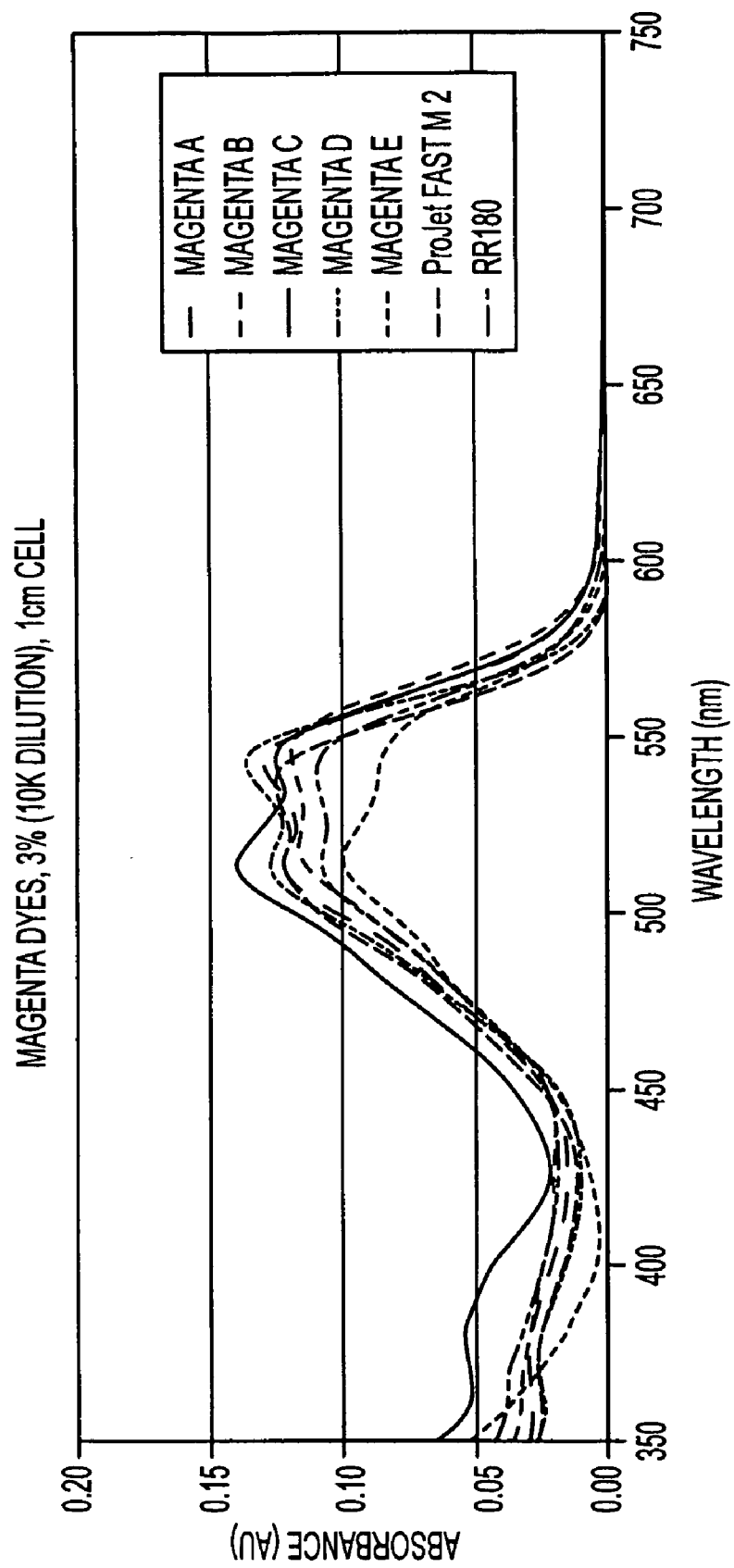
FIG. 10 is a graph in terms of Absorbance and Wavelength respectively demonstrates UV-Vis solution spectra for various magenta dyes.

UV-Vis solution spectra of various magenta dyes are shown in FIG. 10. "Half band width" and "band center" can be used to characterize color of the dyes. These values are listed in the table shown in FIG. 11. The half band width is typically associated with chromaticity of the dyes and is defined as the band width of the spectra at half of the maximum absorbance. The smaller the band width, the higher the chromaticity. "Band center" indicates roughly where the main absorbance is and is related to the hue. The "band center" is defined as the wavelength in the center of the half band. Magenta A and ProJet Fast M 2 show similar absorbance and narrower half band width but the chroma of Magenta A is higher than that for ProJet Fast M 2 on Lustro Laser media with fixer underprinting. A second example is Magenta C vs. RR180 and Magenta B. Magenta C shows much higher absorbance than the other two dyes, however, chroma of Magenta C is significantly lower than RR180 and Magenta B on Lustro Laser with fixer underprinting. Examination of the printed area under an optical microscope shows that Magenta A, RR180 and Magenta B printed area is uniform and featureless while ProJet Fast M 2 and Magenta C show discrete solid deposits on Lustro Laser media. More magenta dyes are tested in the same manner and separate them into three categories:

"Fast precipitating"—discrete solid deposit is seen.

"Slow precipitating"—the printed area is entirely featureless.

"Medium precipitating"—some solid deposit is seen, however, the background area is partially stained with the dye.

Figure 12:
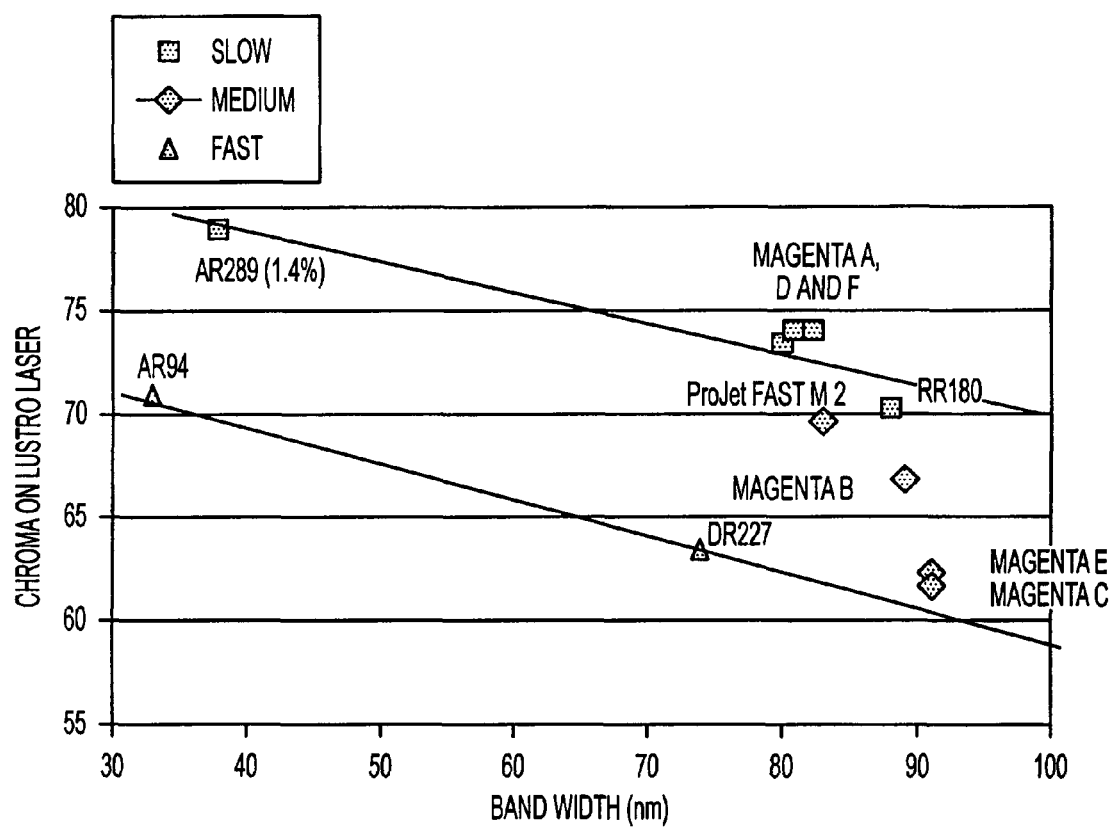
FIG. 12 is a graph which is expressed in terms of chroma and bandwidth and which compares slow, medium and fast precipitating dyes.

A trend is shown in FIG. 12 by plotting the chroma on Lustro Laser vs the half band width. Chroma on Lustro Laser with fixer underprinting can differ as many as 10 units using dye with different precipitating rates. The "slow precipitating" dyes are always in the upper right corner while the "fast precipitating" dyes locate in the lower left corner. The "medium precipitating" dyes sits between the two boundaries. As a result, the "slow-precipitating" dyes are preferred when used with fixer underprinting for improved color performance.

Magenta Dye Blends

Figure 13:
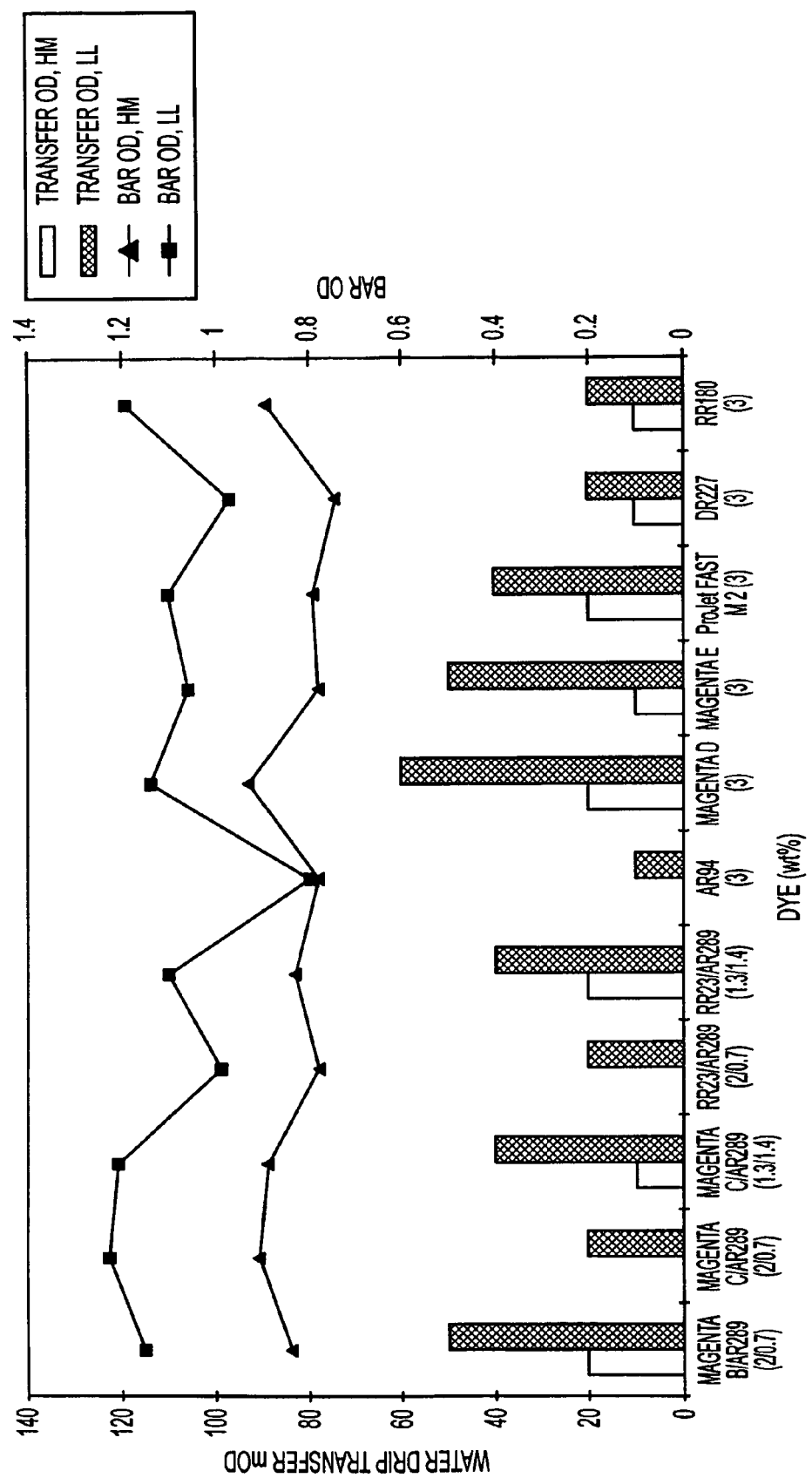
FIG. 13 compares results for a plurality of dyes/combinations in terms of Transfer OD and Bar OD for Hammermill® and Lustro Laser® papers.

Using the same analogy in cyan, magenta dye and dye blends can be used to obtain optimal color and lightfastness properties. Several dyes and dye blends are tested in the same manner as other magenta dyes mentioned previously. The durability of these dyes and dye blends are shown in FIG. 13. In general, all the magenta dyes perform similarly in the test.

Figure 14:
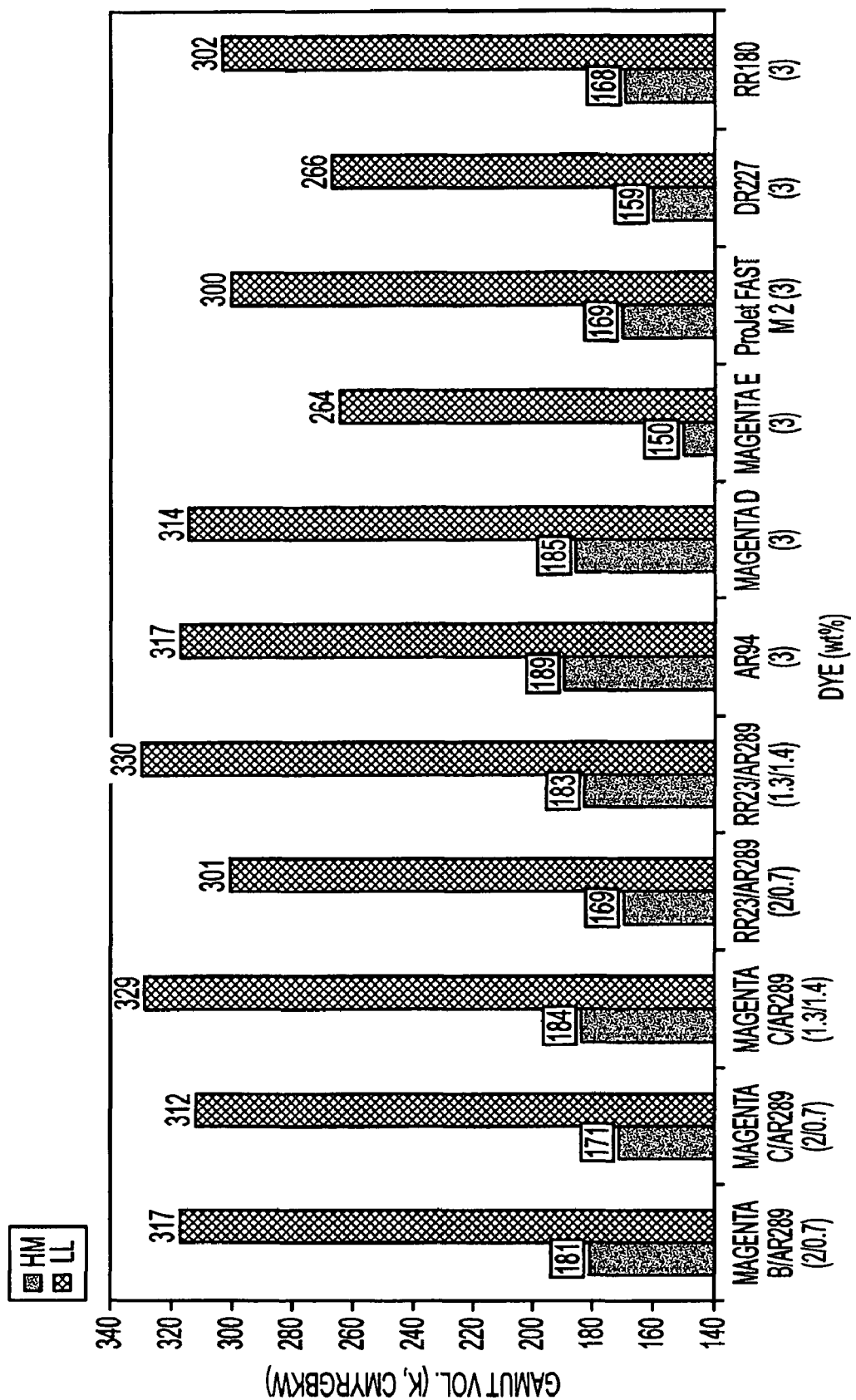
FIG. 14 shows the results of color gamut calculations using various magenta dyes with cyan and yellow dye blends, wherein the gamut volume is estimated from CMYRGBKW.
Figure 15A:
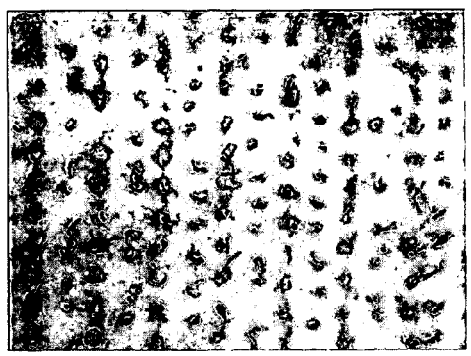
FIGS. 15A-15E and 16A-16F are micrographs of various magenta dyes in the red area fills.
Figure 15B:
Figure 15C:
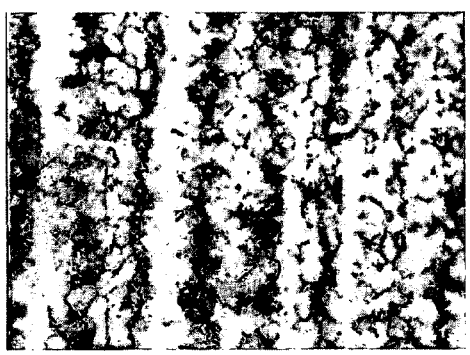
Figure 15D:
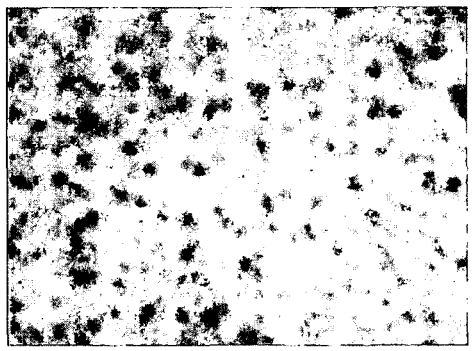
Figure 15E:
Figure 16A:
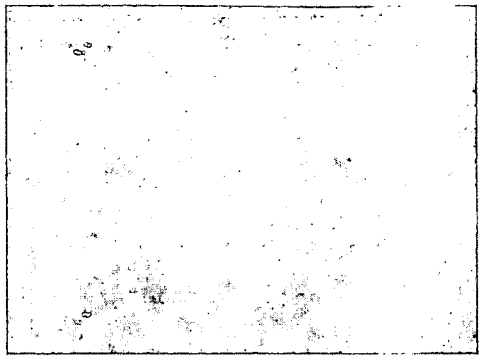
Figure 16B:
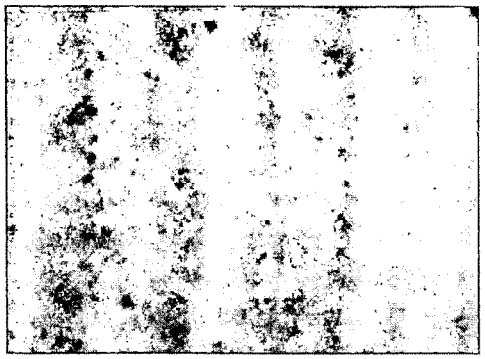
Figure 16C:
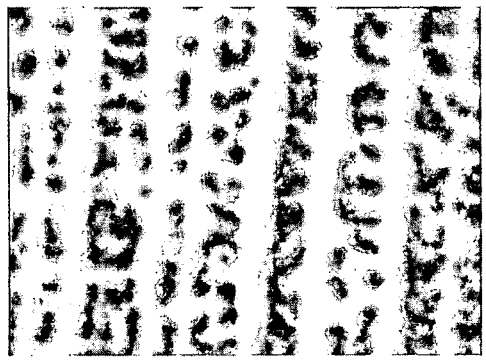
Figure 16D:
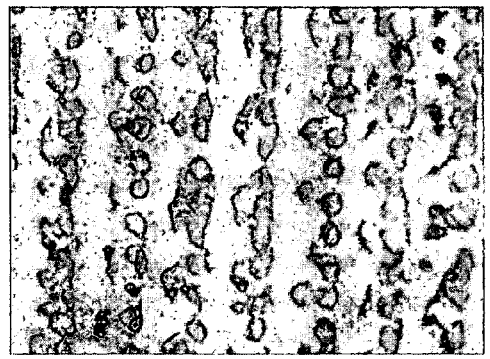
Figure 16E:
Figure 16F:

Calculated color gamut volume (estimated from printed CMYRGBKW) is shown in FIG. 14. The highest gamut (estimated from L*a*b* of CMYRGBKW) is achieved with magenta C/AR289 (1.3%/1.4%) blend and RR23/AR289 (1.3%/1.4%) blend. Gamut volume achieved by AR94 (3%) is similar to Magenta B/AR289, however, this magenta is significantly bluer and the red is slightly worse than Magenta B/AR289. Magenta D shows fairly good gamut volume and the red is better than Magenta B/AR289. Magenta E is similar to Magenta B/AR289 in hue but less chromatic.

Kinetics and Color

Micrographs of red area fills created with different magenta dyes on Lustro Laser are shown in FIGS. 15A-15E and 16A-16F. These micrographs shed lights on the kinetics of precipitation of fixer/dye complex. Examples of slow-precipitating dyes are AR289, RR180, Magenta F, Magenta A and Magenta D. Example of medium-precipitating dye are: ProJet Fast Magenta 2, Magenta B, Magenta C and Magenta E. Examples of fast-precipitating dyes are AR94 and DR227.

will be understood that while the invention has been described with reference to only a limited number of embodiments (ink formulations), the concepts which are imparted by this disclosure will enable a person of skill in the art of ink formulation, to formulate an ink wherein the precipitation rates of the colorants are selected to produce better color and color space.

What is claimed is:
1. An ink for use in inkjet printing, the ink comprising:
a first colorant which has a first precipitation rate in the presence of a predetermined fixer; and
a second colorant which has a second precipitation rate in the presence of the predetermined fixer, wherein the second precipitation rate is selected to be slower than the first precipitation rate, wherein the second precipitation rate is selected to increase dot size to produce an improved color;
wherein the first and second colorants are magenta colorants, wherein the first colorant is a magenta dye selected from the group consisting of Acid Red 94 and Direct Red 227, and wherein the second colorant is a magenta dye selected from the group consisting of a dye having the formula:

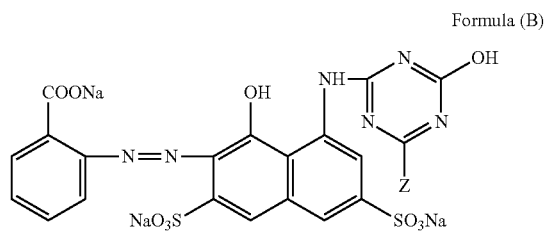
Formula (B)

with a 2,6-dimethylmorpholine substitution on the triazine ring or with a morpholine substitution on the triazine ring; and a dye having the formula:

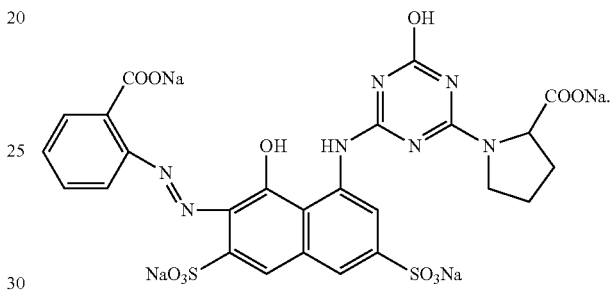

2. The ink as set forth in claim 1, wherein a ratio of the first colorant to the second colorant is selected in accordance with one of a desired color and a desired color space.

3. The ink as set forth in claim 1 wherein the first and second colorants comprise first and second dyes and wherein each of the first and second dyes is present in an amount ranging between 0.05 wt % to 5 wt %.

4. An ink and fixer system for use in inkjet printing, comprising:
a fixer;
a cyan ink;
a magenta ink; and
a yellow ink;
wherein each of the magenta and yellow inks comprise:
a first colorant which has a first precipitation rate in the presence of the fixer; and
a second colorant which has a second precipitation rate in the presence of the fixer, wherein the second precipitation rate is selected to be slower than the first precipitation rate, and wherein the second precipitation rate is selected to increase dot size and to produce a better color and wherein the first colorant in the magenta ink is a magenta dye selected from the group consisting of Acid Red 94 and Direct Red 227 and the second colorant in the magenta ink is a magenta dye selected from the group consisting of Acid Red 289; Reactive Red 180; a dye having the formula:

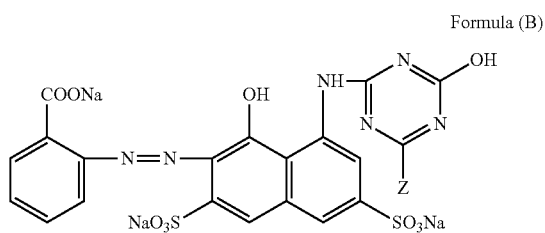

Formula (B)

with a 2,6-dimethylmorpholine substitution on the triazine ring or with a morpholine substitution on the triazine ring; and a dye having the formula:

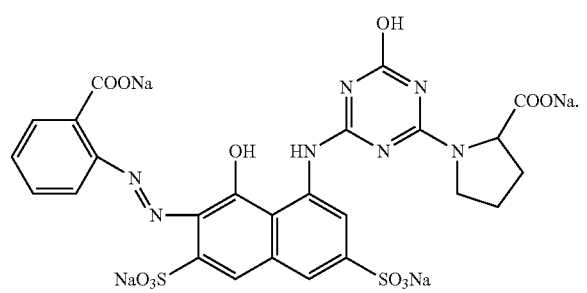

5. The ink and fixer system as set forth in claim 4, wherein the fixer is one of overprinted (OP) or underprinted (UP) with respect to the ink.

6. The ink and fixer system as set forth in claim 4, wherein the fixer comprises a cationic polymer and/or an acid and/or metal salts.

7. The ink and fixer system as set forth in claim 6, wherein the colorants are each an anionic dye and the cationic polymer is configured to interact with the anionic dyes to precipitate the dyes.

8. The ink and fixer system as set forth in claim 6, wherein the cationic polymer comprises one of the group of polyamine, quaternized polyamine and polyguanidine.

9. The ink and fixer system as set forth in claim 8, wherein the polyamine is used at a pH which is less than 8.

10. The ink and fixer system as set forth in claim 6, wherein the fixer further comprises an acid buffer.

11. A method of printing, comprising:
    selecting a fixer;
    formulating a magenta ink to comprise:
        a first colorant which has a first precipitation rate in the presence of the fixer, wherein the first colorant is a magenta dye selected from the group consisting of Acid Red 94 and Direct Red 227; and
        a second colorant which has a second precipitation rate in the presence of the fixer, wherein the second precipitation rate is selected to be slower than the first precipitation rate, wherein the second precipitation rate is selected to increase dot size and to produce a better color, and wherein the second colorant is a magenta dye selected from the group consisting of Acid Red 289; Reactive Red 180; a dye having the formula:

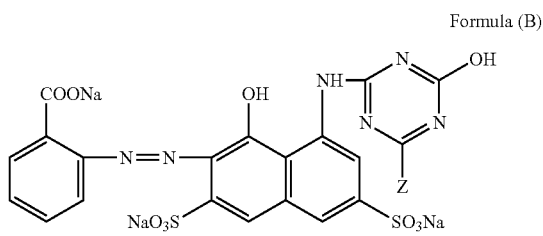

Formula (B)

with a 2,6-dimethylmorpholine substitution on the triazine ring or with a morpholine substitution on the triazine ring; and a dye having the formula:

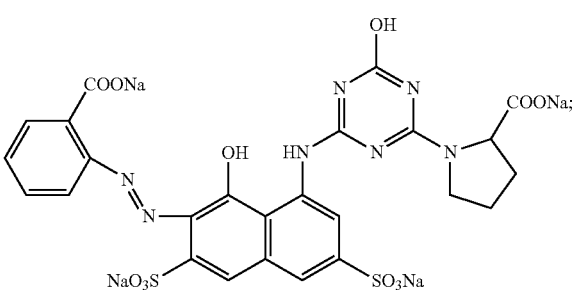

jetting the magenta ink; and
jetting the fixer either over or under the magenta ink.

12. The method as set forth in claim 11, wherein the fixer is formulated to comprise a cationic polymer and/or an acid and/or metal salts.

13. The method as set forth in claim 12, wherein the colorants are each an anionic dye and the cationic polymer is configured to interact with the anionic dyes to precipitate the dyes.

14. The method as set forth in claim 12, wherein the cationic polymer comprises one of the group of polyamine, quaternized polyamine and polyguanidine.

15. The method as set forth in claim 14, wherein the polyamine is used at a pH which is less than 8.

16. The method as set forth in claim 12, wherein the fixer is formulated to further comprise an acid buffer.

* * * * *